(12) United States Patent
Fling et al.

(10) Patent No.: US 7,119,711 B2
(45) Date of Patent: Oct. 10, 2006

(54) COMMUNICATING WITH AN UNDERGROUND OBJECT

(76) Inventors: Richard William Fling, Woodlands 38 Grange Road, Stratford, Bristol BS31 3AG (GB); Alberto Iaccarino, 23 Cromwell, Cheltenham GL52 5DN (GB)

( * ) Notice: Subject to any disclaimer, the term of this patent is extended or adjusted under 35 U.S.C. 154(b) by 532 days.

(21) Appl. No.: 10/631,012

(22) Filed: Jul. 31, 2003

(65) Prior Publication Data

US 2005/0024233 A1    Feb. 3, 2005

(51) Int. Cl.
    *G01V 3/00*    (2006.01)
(52) U.S. Cl. ............ 340/854.6; 175/73; 324/326; 340/854.9
(58) Field of Classification Search ........ 340/854.6, 340/854.9; 324/326; 175/73
    See application file for complete search history.

(56) References Cited

U.S. PATENT DOCUMENTS 5,530,357 A    6/1996    Cosman et al. ........... 324/326

6,588,116 B1 *    7/2003    Dallas et al. ............. 33/313
6,606,032 B1        8/2003    Fling ..................... 340/853.3
2005/0104743 A1 *    5/2005    Ripolone et al. ........ 340/855.1
2005/0274548 A1 * 12/2005    Albert et al. .............. 175/61

FOREIGN PATENT DOCUMENTS

GB    2404393 A *    2/2005

OTHER PUBLICATIONS

Search Report dated Nov. 6, 2003.

* cited by examiner

*Primary Examiner*—Timothy Edwards, Jr.
(74) *Attorney, Agent, or Firm*—Baker & Hostetler LLP

(57) ABSTRACT

A data sonde for use in horizontal drilling is provided, the data sonde comprising an antenna for emitting a first modulated signal from the data sonde, the first signal comprising zero and non-zero emission components in different periods, and a receiver for receiving an intermittent second data signal during first signal zero emission periods. A method of operation of the same is also provided.

44 Claims, 12 Drawing Sheets

COMMUNICATING WITH AN UNDERGROUND OBJECT

FIELD OF THE INVENTION

The present invention relates to down hole locators, commonly known as sondes. Specifically, the present invention relates to communication with sondes for use in horizontal applications, such as pipe laying and utility cable installation etc.

BACKGROUND OF THE INVENTION

Sondes are widely used in horizontal drilling applications such as pipe laying, and utility cable installation applications. In such situations, sondes are used to provide information on the location of the head of the drill. This is generally achieved by emission of an electromagnetic signal from the sonde and detection of the signal on the surface. Additionally, the sonde may provide other information to the surface, such as the azimuthal angle, yaw and pitch etc.

Sondes are generally powered using a wireline from a power supply on the surface to the sonde, while the sonde is in the ground or "down-hole". Such sondes are generally also controlled from the surface by using a dedicated line within the wireline from the surface, along the pipe, to the sonde. The dedicated line may then also be used for the sonde to communicate back to the surface with details of azimuthal angle etc. Such wireline sondes have a disadvantage that the range is limited by the length of the wireline from the surface to the sonde, and operational time is increased, along with inconvenience and cost, by the need to insert sections of communication and power cable within the rods used to push the drill head and sonde underground during drilling.

Battery powered sondes may be used in order to overcome this range problem. However, removal of the wireline also removes the dedicated control and communication channel meaning that the surface control can no longer directly communicate with the sonde, and the sonde can no longer directly communicate with the surface. In order to overcome this, U.S. patent application Ser. No. 09/504,833, the contents of which are incorporated herein by reference, allows control of the sonde by a series of coded rotations of the head containing the sonde, which the sonde detects and decodes into instructions. However, while such a control system is practical and reliable, such rotations are slow to transmit control instructions.

As discussed above, both wireline and battery powered have advantages and disadvantages in communications to the sonde. However, a user of sondes is required to buy both a battery powered sonde and a wireline sonde for the different requirements. This is because, generally, it is not possible to combine a battery powered sonde with a wireline sonde in a single apparatus because the circuitry for each is mutually exclusive and a different communication method is used for each, resulting in a size requirement too large to be placed in an industry standard sonde casing. Therefore there is a need to produce an improved sonde.

SUMMARY OF THE INVENTION

According to an aspect of the invention, there is provided a data sonde, which can be communicated with from an external unit. In an embodiment, the communication received by the sonde is sent along a wireline connected at one end to the sonde, and at the other end to a surface control unit. In an embodiment, this communication is by modulation of the power supply voltage supplied to the sonde along the wireline. In an embodiment of the invention, the communication is received by the sonde by EM receiving means in the sonde. In an embodiment, the receiving means is an antenna in the sonde. In an embodiment, the receiving means is a voltage detector, and/or a data decoder.

In an embodiment, the antenna is also an emitting means, used for emitting EM signals from the sonde. In an embodiment, the transmitted and received signals are interleaved. In an embodiment of the invention, the transmitted signal is a high frequency signal onto which a 100% AM modulated secondary signal is added, and the received signal is received during zero emission periods of the transmission. In an embodiment, the received signal is processed, and at least part of the received signal is transmitted from the sonde. In an embodiment the received signal is received from an external sensor system, having external sensors.

In an embodiment, the sonde emits a relatively high frequency signal, which is modulated with a 100% AM modulation, the AM modulation imparting additional data on the high frequency signal. In an embodiment, the sonde 100% AM modulation frequency is lower than the signal frequency received by the sonde. In this way, more information can be transmitted to the sonde in each "off" period. In an embodiment, the received signal is a binary signal.

In an embodiment, the sonde may be either battery or wireline powered, without change of operational circuitry. In an embodiment, when operating as a wireline system, commands are sent from the surface control unit to alter operational characteristics, such as the locate frequency emitted by the sonde or sensor signal conditioning functions. In an embodiment, when operating from a battery power source, data is transmitted from an external device, such as an external sensor system, into the sonde such that this data can be incorporated into the normal operation output of the sonde.

In an embodiment, the communication system is also used to replace the software for the purposes of product maintenance or functional upgrade. In an embodiment, the communication system can also be used to alter configuration settings of the operational characteristics of the sonde. Where the sonde is battery powered, this is advantageous because of the practical inconvenience in a system altering such parameters whilst down-hole using the coded rotation method described in U.S. patent application Ser. No. 09/504,833. Configuration controls beneficial to the system may include in embodiments:

1. Setting the output EM signal level to provide longer operation time from a set of batteries (with a reduced output power signal) or increase the output EM signal level to overcome interference (with a shorter operation time).

2. Setting the output EM signal carrier frequency to a specified frequency to optimise the data recovery performance of an associated EM receiver operating with particular situation specific EM interference signals. In an embodiment the sonde can be programmed to operate at the optimum operating frequency to create optimum system performance, when used in conjunction with an associated receiver which has a means of determining the optimum frequency (such as a frequency scanning process).

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Specific embodiments of the invention will now be described, purely by way of example, with reference to the accompanying drawings, in which.

DETAILED DESCRIPTION OF SPECIFIC EMBODIMENTS

Figure 1:
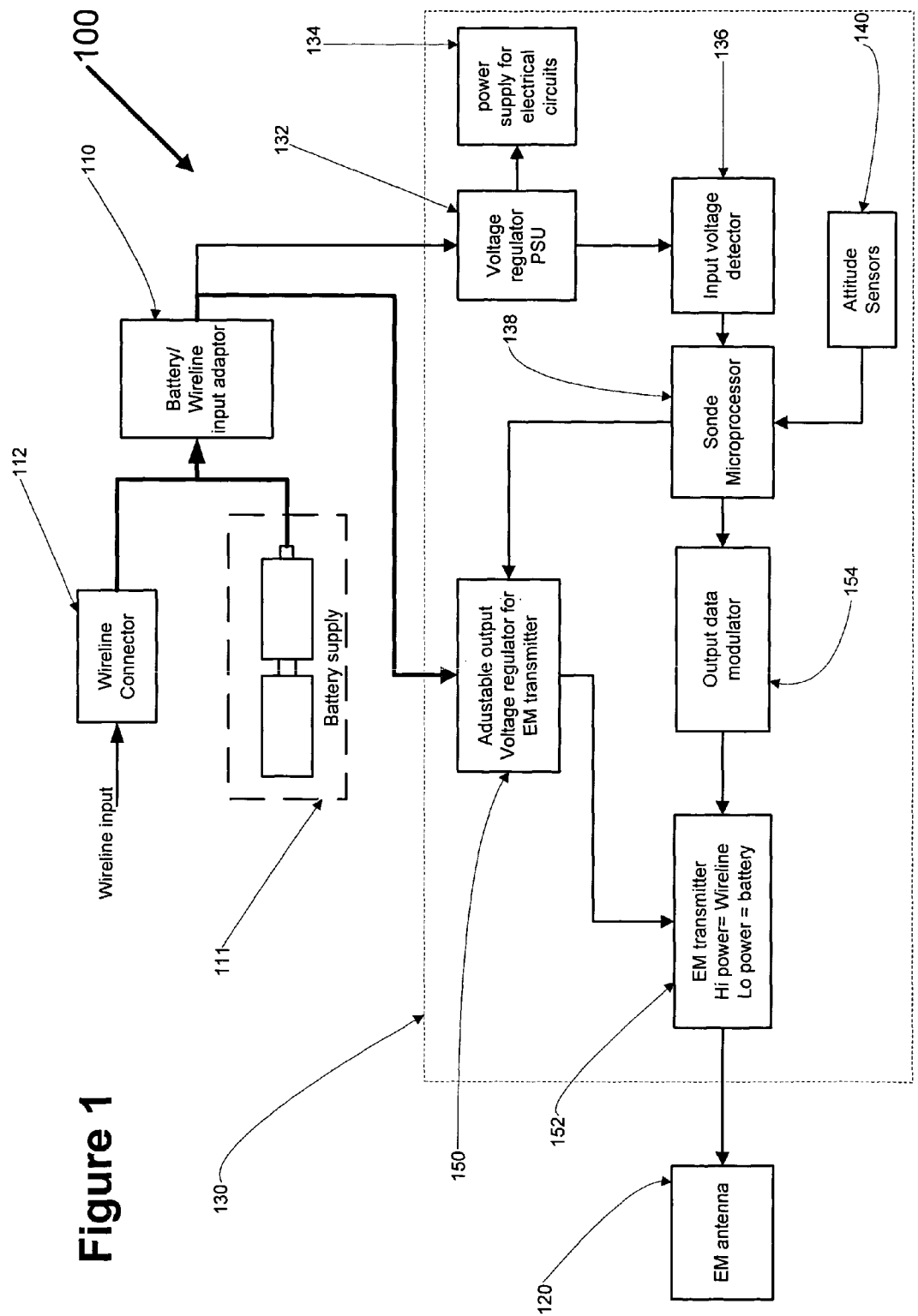
FIG. 1 shows a data sonde according to a first embodiment.

FIG. 1 shows a data sonde 100 according to a first embodiment. The data sonde 100 comprises a power supply receiving unit 110, which receives either a wireline 120 from a surface control unit, or one or more batteries 125 for alternative power of the data sonde 100 when a wireline 111 is not connected to it through the power supply receiving unit 110.

An antenna 120 is also provided, which is connected to the power supply receiving unit 110, and which emits an electromagnetic signal. Control circuitry 130 is also provided, which controls the emission of the antenna 120.

The power supply receiving unit 110 comprises a female recess, into which can be placed either one or more batteries 111, or a male connector 112 from a wireline, depending upon whether the sonde 100 is to be battery powered or wireline powered. The antenna 120 is controlled by the control circuitry 130 and radiates an electromagnetic field for use in determining the location of the sonde 100, which can be detected by a surface locator.

The control circuitry 130 receives power from the power supply receiving unit 110. The control circuitry 130 comprises a power section and a control section. The control section comprises a voltage regulator 132, which receives power supply from the power supply receiving unit 110 and supplies it to other electrical circuits 134 of the sonde 100, and to an input voltage detector 136. The voltage detector 136 detects whether the sonde 100 is receiving battery power or wireline power, wireline power having a higher voltage, and inputs data representing this information into a microprocessor 138. The microprocessor 138 also receives other data from various sensors within or connected to the sonde 100 from sensors 140. The sensors 140 may be housed within the sonde 100, or may be external thereto.

Within the power section of the control circuitry 130, an adjustable output voltage regulator 150 is provided, which powers an EM transmitter circuit 152. The EM transmitter 152 is a constant current transmitter. The power drawn by the transmitter 152 is therefore proportional to the voltage supplied to it. The microprocessor 138 controls the adjustable output voltage regulator 150 on the basis of the voltage detected by the voltage detector 136. The adjustable output voltage regulator 150 receives the power supply from the power supply receiving unit 110 and regulates the power output to the EM transmitter 152.

The microprocessor 138 also produces an encoded output at a relatively low data rate of approximately 37.5 Hz. The encoded output is input into an output data modulator 154. The output data modulator 154 controls the energising of the EM transmitter 152. The EM transmitter 152, when energised, generates a high frequency AC signal. The transmitter 152 draws a constant current and voltage when turned on and minimal current and voltage when turned off. Therefore, the transmitter 152 acts as an AC isolator between the antenna 120 and the power supply receiving unit 110. Therefore, when operating under battery power, the AC frequencies do not travel back to the power supply receiving unit.

The EM transmitter 152 output is the output of the control circuitry 130, and this transmitter 152 output energises the antenna 120 causing it to emit radiation at the same high frequency generated by the transmitter 152. This high frequency oscillation can be detected by a locator on the surface. In addition to the AC signal generated by the transmitter 152, which is emitted by the antenna 120, the output data modulator 154 controls the energisation of the transmitter 152. The output data modulator 154 is effectively a switch turning the transmitter 152, and therefore antenna 120, on and off.

Figure 2:
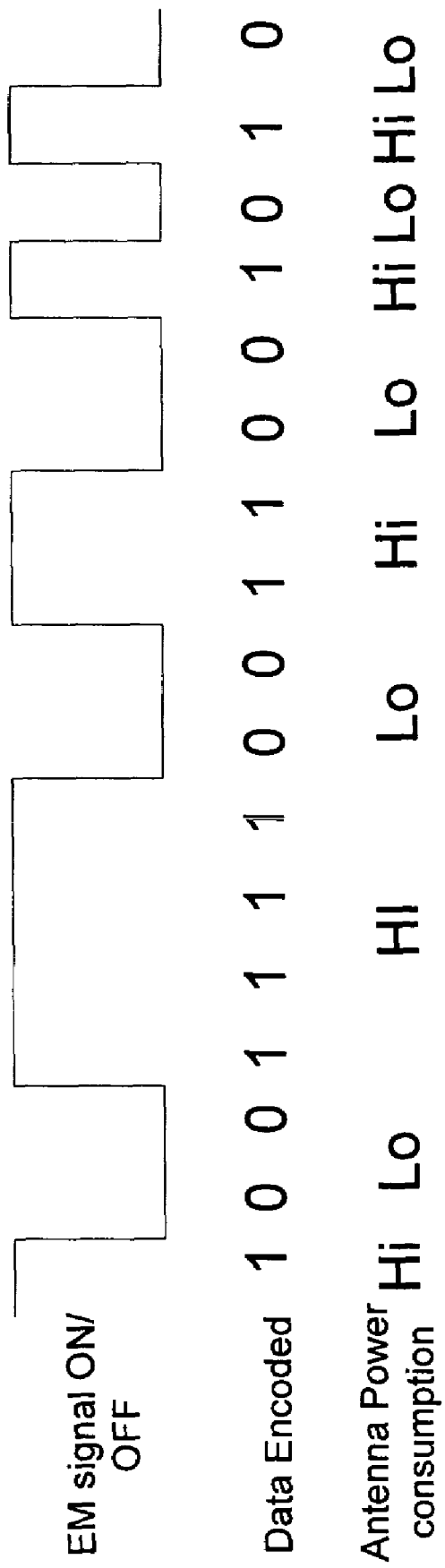
FIG. 2 shows exemplary power consumption by the data sonde of the first embodiment, the surface control unit detected power provision.

As shown in FIG. 2, the effect of the output data modulator 154 is to create a DC signal on the AC antenna emission. This signal is a binary signal. The antenna 120 is turned on and off in an encoded manner. The effect of the output data modulator 154 control of the transmitter 152 is two-fold. Firstly, the AC emissions from the antenna 120 are binary modulated. Secondly, the power supply drawn by the antenna 120, which makes up the majority of the power drawn by the sonde 100, is modulated in correspondence with the on-off modulation of the antenna 120.

This binary signal can be detected. When the sonde 100 is operating in battery mode, the binary signal can be detected by circuitry in the locator detecting the on-off modulation of the emitted signal, and then decoding the modulation. In wireline mode, the power drawn by the antenna 120 can be monitored and the on-off binary signal detected and decoded similarly. This detection of the modulation is simplified by the fact that the antenna 120 power makes up the majority of the power consumption of the sonde 100.

This mode of operation is therefore suitable for both wireline and battery operation, with no change in circuitry or operation required. Such a sonde can therefore be either battery or wireline powered, while having no requirement for separate operating modes and circuitry for each, thus saving space and allowing the sonde to be compact.

Figure 3:
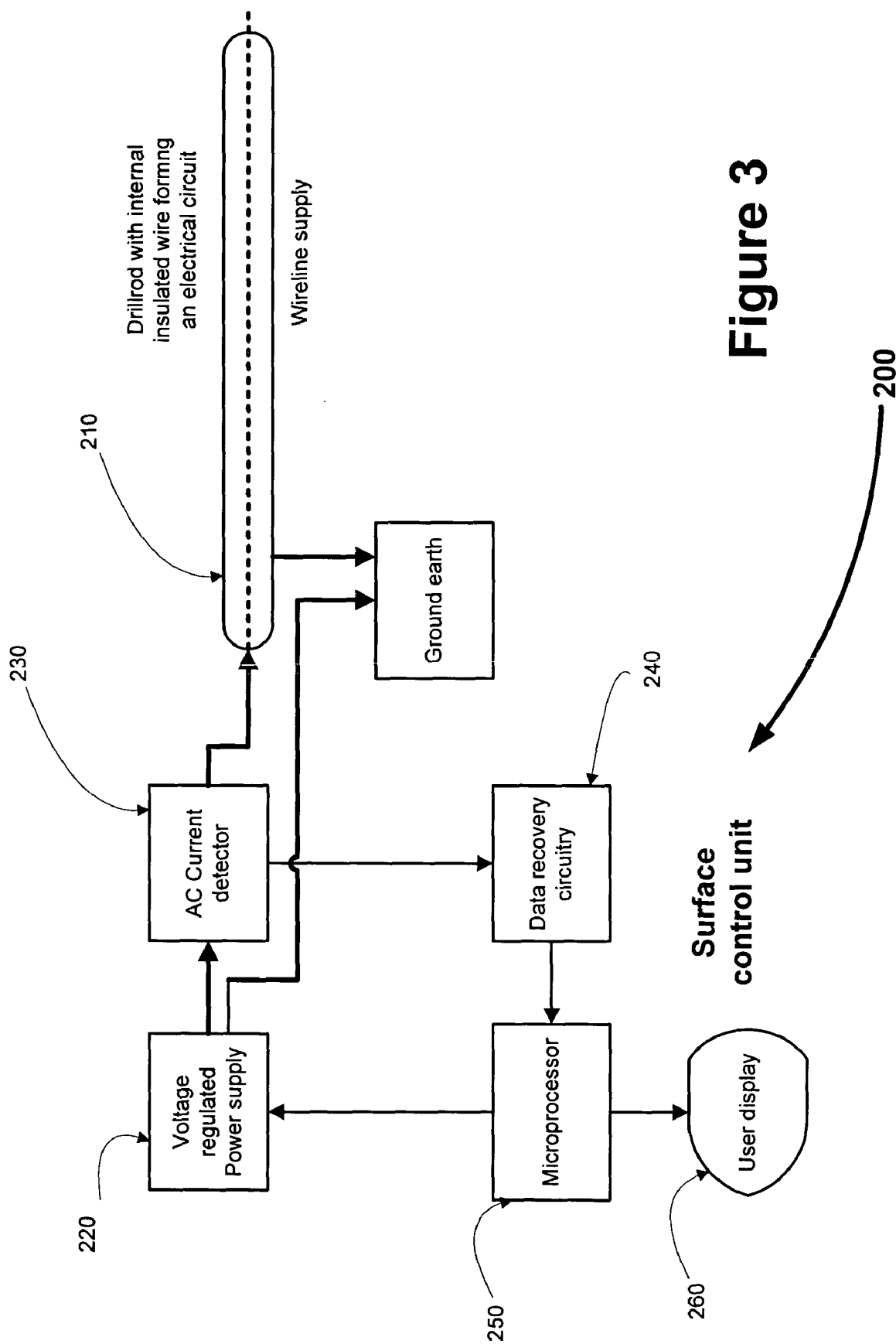
FIG. 3 shows a surface control unit for use with a data sonde according to the first embodiment.

FIG. 3 shows an apparatus for use in detecting the on-off modulation of the antenna when the sonde 100 of the first embodiment of the invention is operating in wireline mode. The wireline 210 itself comprises a drill rod with internal insulating wire, which forms an electrical circuit (the exterior of the drill rod providing a connection to earth). A voltage regulated power supply is generated in the power supply unit 220 and input into the wireline 210 via a current detector 230. The current detector 230 detects the current drawn from the sonde 100 along the wireline 210. The detected current drawn is fed to a data recovery circuit 240 and the decoded data is fed in a microprocessor 250, which outputs for display the results on a user display 260.

In this way the secondary data from the sonde can be communicated along the wireline 210 without a change in operation of the sonde 100 from when it is operating as a battery sonde.

Figure 4:
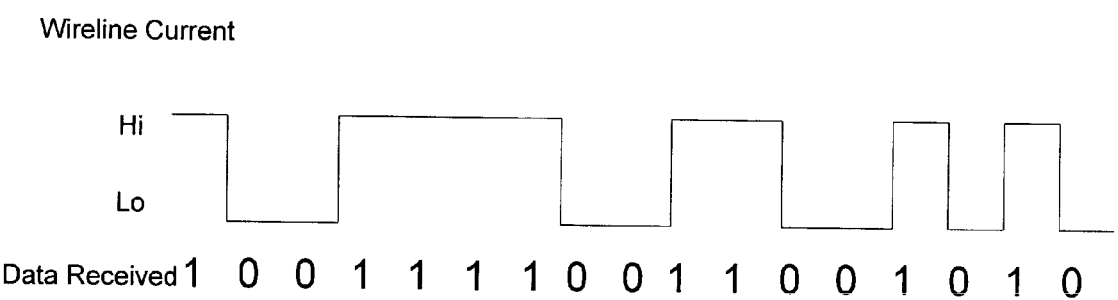
FIG. 4 shows an exemplary detected power consumption of the sonde of the first by the surface control unit.

FIG. 4 shows data received from the wireline by the surface unit. A binary 'one' is represented where high wireline current (indicating high current draw from the sonde) is detected, and a binary 'zero' is represented where low wireline current is detected.

Figure 5:
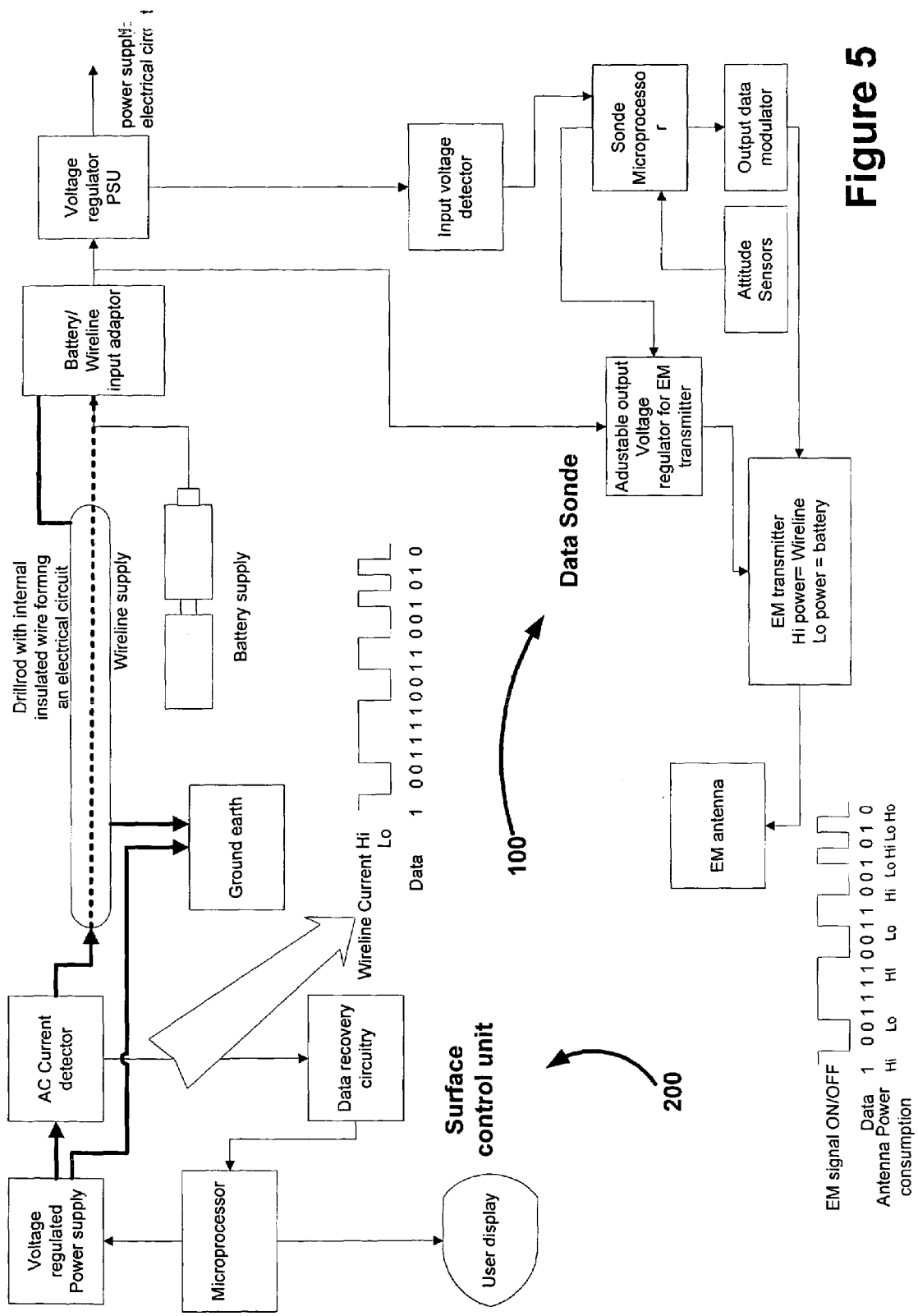
FIG. 5 shows a system comprising a surface control unit and sonde according to the first embodiment.

FIG. 5 shows a system comprising both a sonde and a surface control unit. The sonde and surface control unit correspond to those discussed above. The operation of the system is as described above in relation to the surface control unit and sonde, when in wireline operation.

Figure 6:
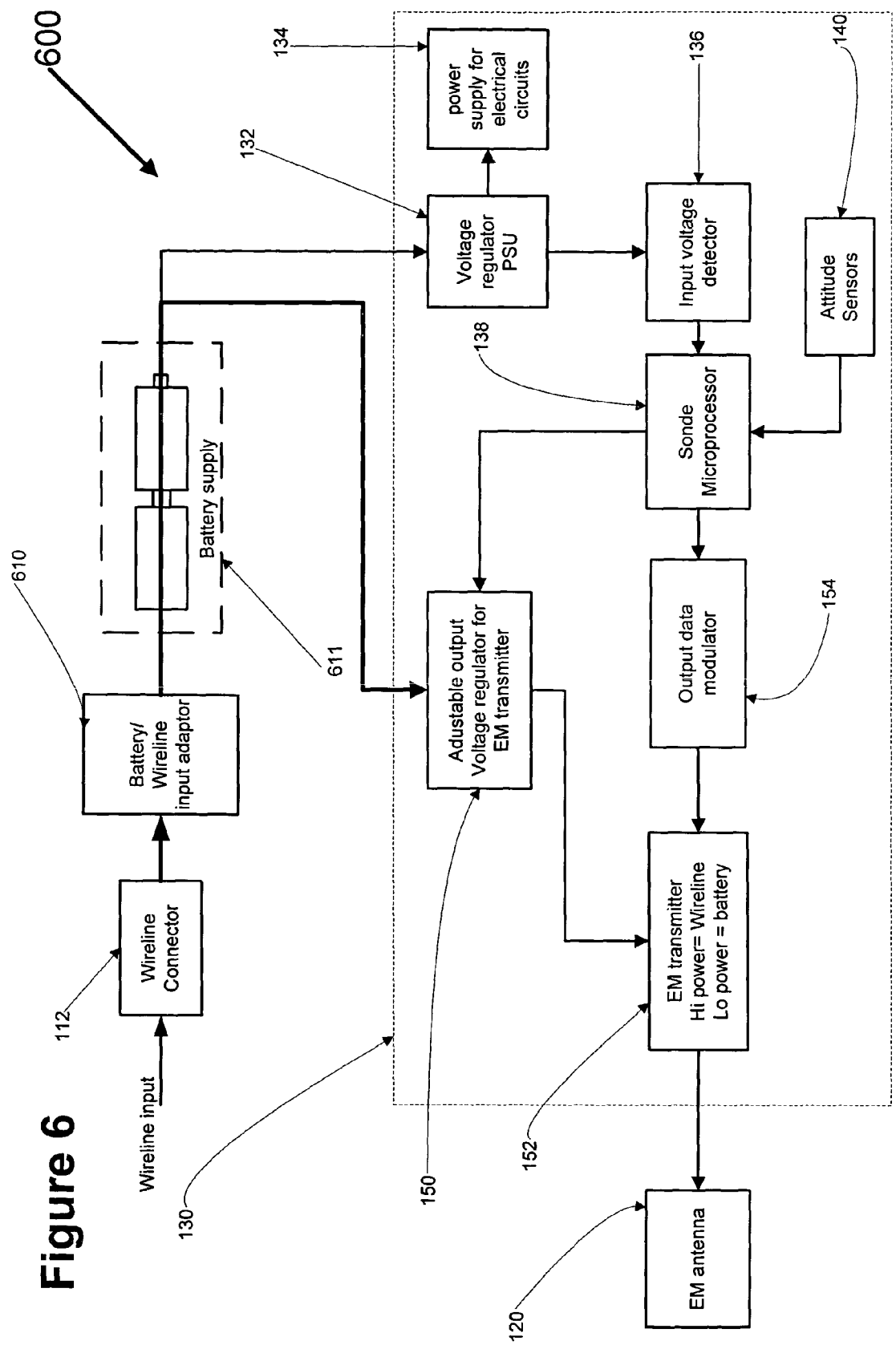
FIG. 6 shows a second embodiment showing an alternative sonde.

FIG. 6 shows a second embodiment, similar to the sonde of the first embodiment, where the batteries 611 are placed in series with the wireline connector 112 after the power supply receiving unit 610. The sonde 600 functions in the same way and is the same in other respects to the sonde 100 described above.

Figure 7:
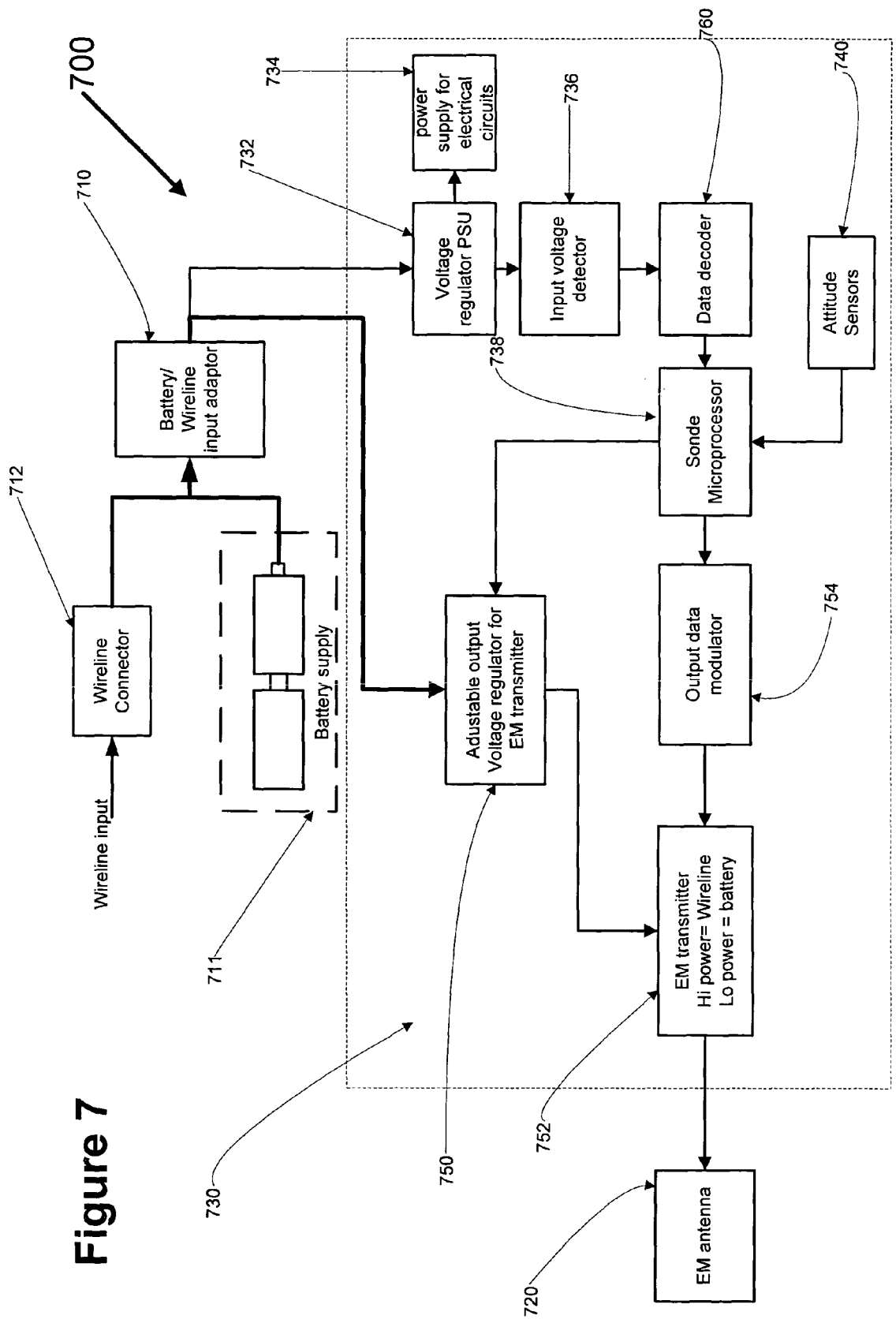
FIG. 7 shows a third embodiment showing a further alternative sonde.

Additionally, the voltage detector of the first and second embodiments can be adapted, as shown in a third embodiment in FIG. 7, to identify whether it is receiving normal wireline voltage, battery voltage, or a third voltage, which indicates that the wireline power supply is carrying a signal, which can be decoded. An additional data decoder 760, acting as receiving means, is provided between the input voltage detector 736 and the sonde microprocessor 738 to decode the signal from the surface control unit, which could be the surface control unit described with reference to FIG. 9 below. The data decoded by the data decoder 760 is fed into the sonde microprocessor 738. The data by be instructions to the sonde to alter operational characteristics, such as locate frequency or sensor signal conditioning functions etc.

The communication system may also be used to replace or upgrade software for the purposes of product maintenance or functional upgrade.

The sonde of the third embodiment may function either as a wireline or battery sonde, as in the first and second embodiments. Alternatively, the sonde may be a dedicated wireline sonde, in which case parts 710 and 711 are simply omitted from the sonde and the wireline input can be fed directly into the sonde circuitry.

Figure 8:
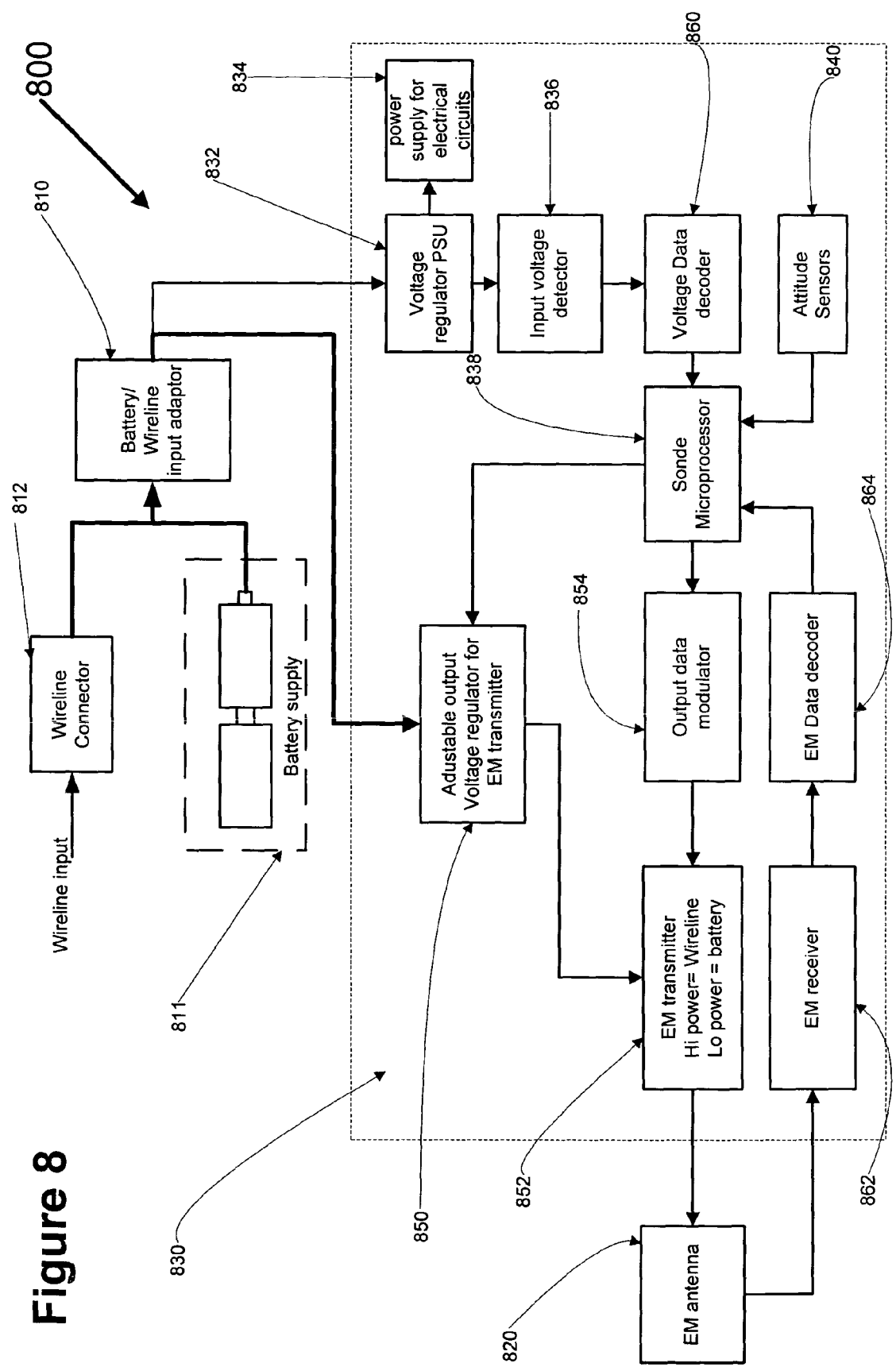
FIG. 8 shows a fourth embodiment, relating to the invention.

FIG. 8 shows a sonde according to a fourth embodiment. The sonde according to the fourth embodiment is similar to that of the third embodiment. In addition to the operational units of the third embodiment, which have the same or equivalent functions and reference numbers have the initial number 7 replaced with an 8, an EM receiver 862 is provided. The EM receiver is connected to a data decoder 864. The data decoder 864 is connected to the sonde microprocessor 836.

Figure 9:
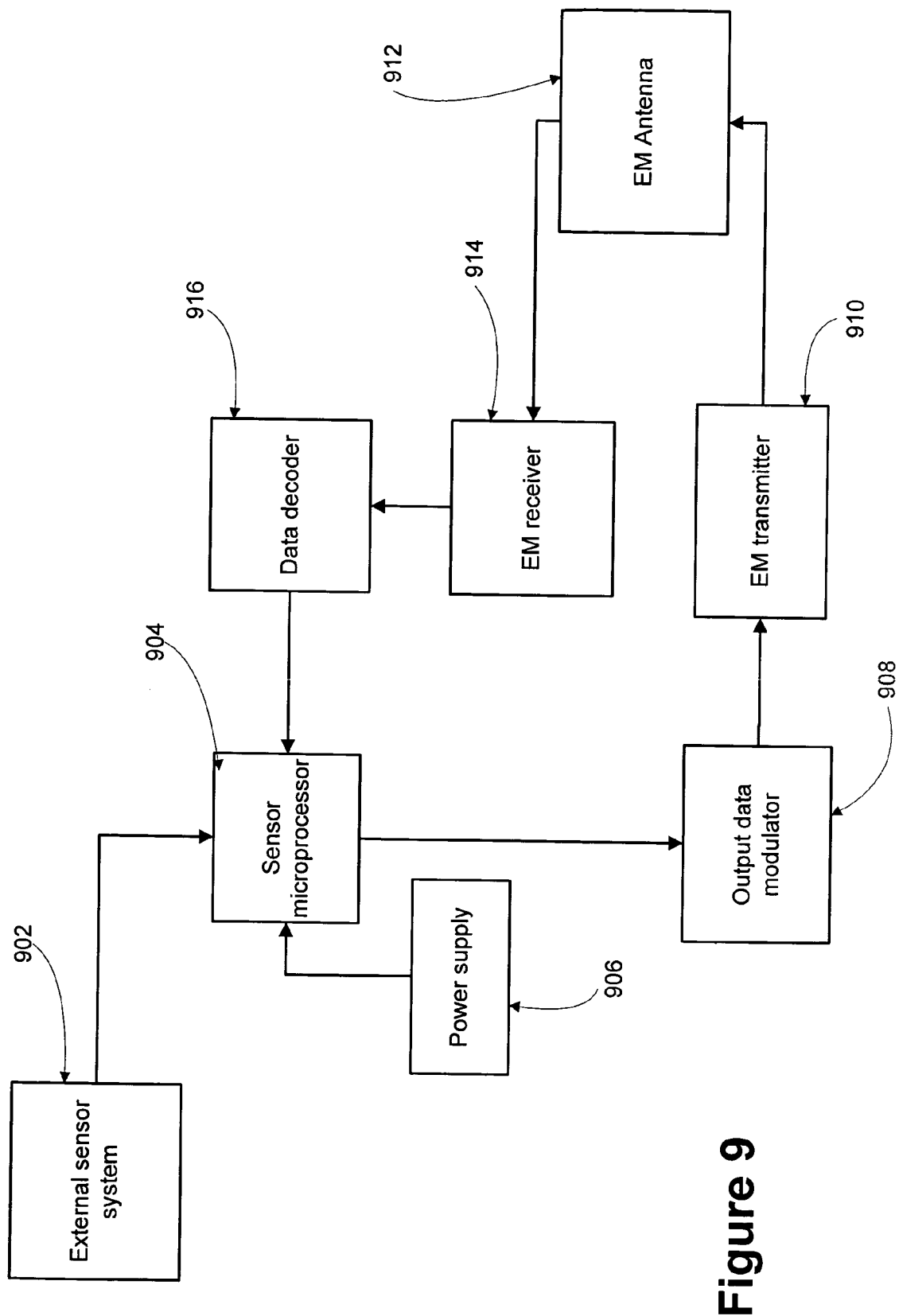
FIG. 9 shows an external sensor system for use with the sonde of the fourth embodiment.

The EM antenna 820, as well as transmitting at a low D.C. modulation rate as described above, also receives EM signals and converts them into an electrical signal, which is passed to the EM receiver 862. The EM receiver 862 then passes the received signal to the data decoder 864, which decodes the received signal, and the data decoder 864 passes the decoded data to the sonde microprocessor 836, which processes the information received. The information received may be from an external sensor system, as shown in FIG. 9, described below. The data received may relate to information sensed by the external sensor system. The sonde microprocessor 838 may use these external sensed information to modify its operation, or what, if anything is transmitted to the surface, which could be by the system described in relation to the first, second and/or third embodiments, or could transmit the data received from the EM antenna 820, or a processed version of it, through the EM emission modulation, to the surface.

The sonde 800 of the fourth embodiment may be a wireline/battery sonde as described above in relation to the first and second embodiments, or may be a dedicated wireline sonde, in which case parts 810 and 811 are omitted as may be done in the third embodiment. Alternatively, the sonde 800 may be a dedicated battery sonde, in which case parts 810 and 812 may be omitted.

FIG. 9 shows a suitable external sensor system 900 for use with a sonde according to the present invention. The sensor system 900 comprises one or more sensors 902, connected to a sensor microprocessor 904. The sensor microprocessor is connected to a power supply 906. A output data modulator 908 is connected to the sensor microprocessor 904, and an EM transmitter 910 is connected between the output data modulator 908 and an EM antenna 912.

The data detected by the sensor(s) 902 is input into the sensor microprocessor 904, which processes the data received. The sensor microprocessor 904 generates data to be output and provides it to the output data modulator 908, which controls the EM transmitter 910, which, in turn, drives the EM antenna 912 to output an EM signal.

Also connected to the EM antenna is a data decoder 916, via an EM receiver 914. The data decoder decodes data received by the EM antenna, and provides it to the sensor microprocessor 904. In this way, the sensor microprocessor 904 can control the output of the EM antenna 912 so that it is energised only when the sonde antenna 820 is not transmitting. In this way, swamping of the signal is avoided, and the sonde EM data decoder 864 will receive the signal output from the external sensor system 900. It is also possible for the sonde microprocessor 838 and sensor microprocessor 904 to have two way communication between them in this way.

Figure 10:
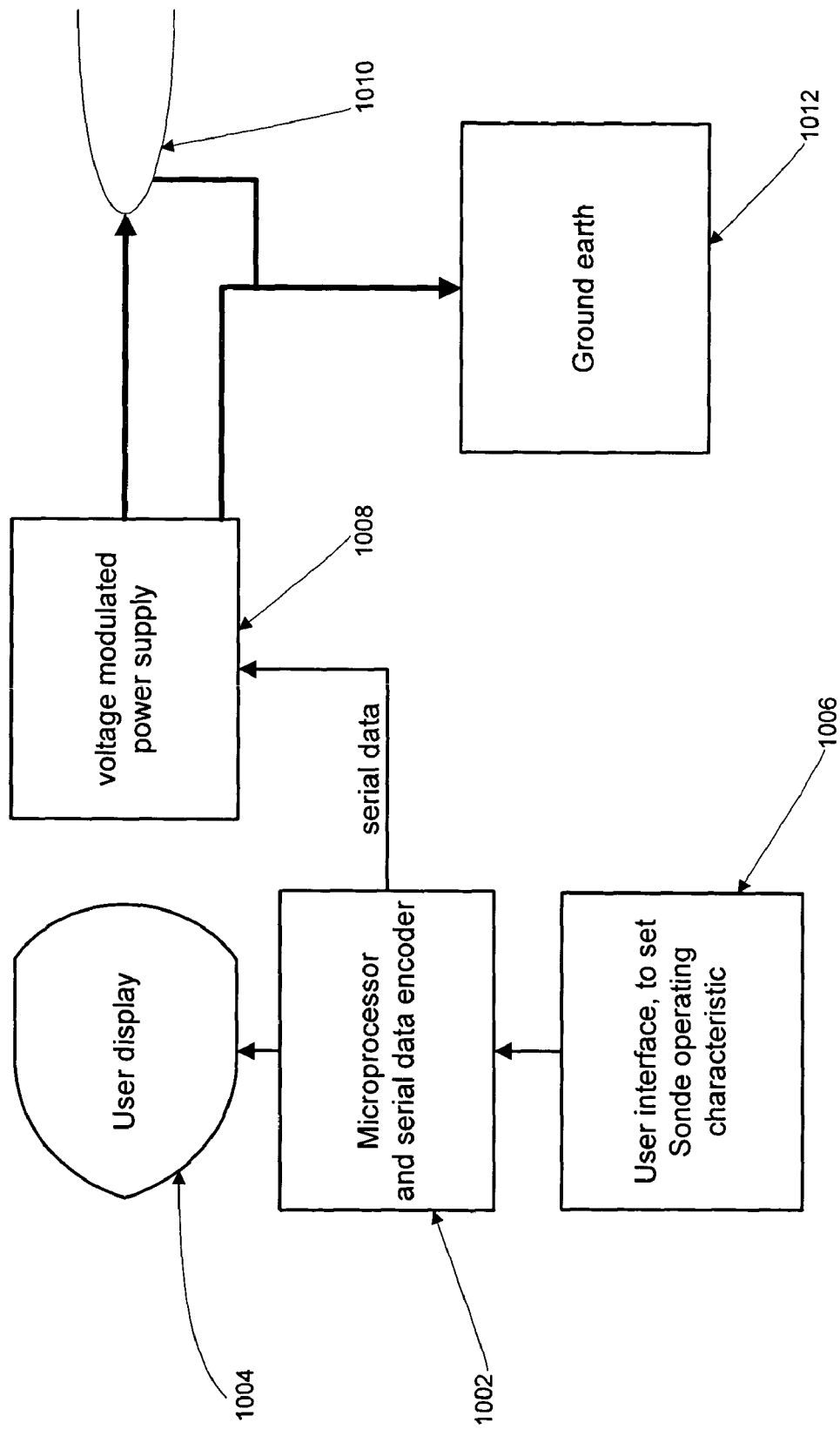
FIG. 10 shows a surface control unit for use with the sonde of the fourth embodiment.

FIG. 10 shows a surface control unit 1000 that could be used with the sonde of the fourth embodiment. The surface control unit comprises a microprocessor and serial data encoder 1002, connected to a user display 1004, a user interface 1006, and a voltage modulated power supply 1008.

The microprocessor 1002 receives parameters and instructions from the user interface 1006, which can be used to configure the sonde. The user display 1004 shows the current operation and other characterisics and data relating to the sonde, and, where the surface control unit 1000 is modified to include features of the surface control unit of the first embodiment, shows data received from the sonde along the wireline. The microprocessor 1002 controls the voltage modulated power supply 1008 to send data as voltage modulations along a wireline 1010, to the sonde, where the data is decoded as described above.

As described above, the voltage output from the surface control unit 1000 is modulated to send data to the sonde 800. The data is sent while the sonde 800 is not transmitting and is detected as described above. The sonde 800 may simply be programmed not to transmit for certain periods of time, in order to allow half-duplex communication from the surface control unit 1000 to the sonde 800. Alternatively, the sonde 800 may be communicating with the D.C. amplitude modulation, which can also be detected at the surface, making use of a surface control unit having decoding features as discussed above in relation to the first embodiment, which is altered to also include the data transmission features of the surface control unit of FIG. 10.

Figure 11A:
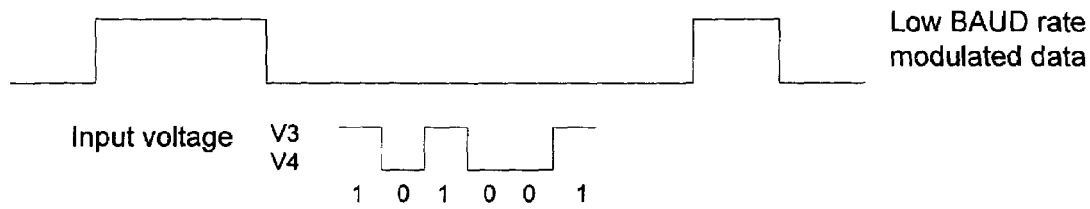
FIG. 11 shows an example of the interleaving of first and second data transmissions.
Figure 11B:
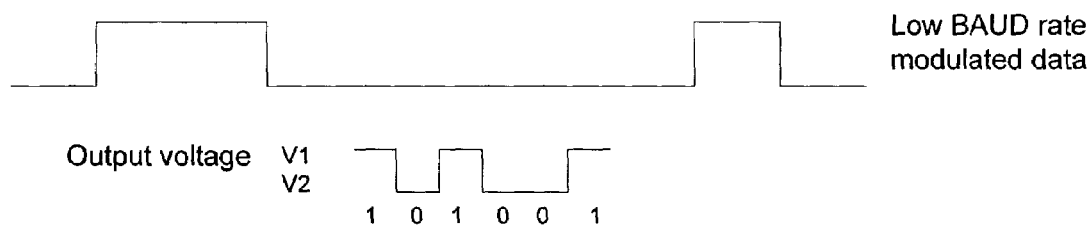
Figure 11C:
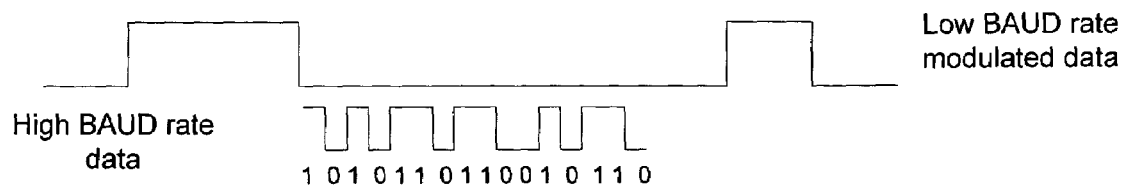

FIG. 11 shows exemplary communication between the sonde 800 and the surface control unit 1000, and the sonde 800 and the external sensor system 900. In FIG. 11a, the voltage output from the surface control unit 1000 is shown in relation to the D.C. binary modulated signal output from the sonde 700, 800, as described above. In FIG. 11b, the voltage detected by the input voltage detector 736, 836 is shown, again in relation to the D.C. binary modulated signal output from the sonde. FIG. 11c shows the interleaving of signals from the sonde 800 and from the external sensor system 900.

Where data from the sonde is 100% AM modulated onto the carrier frequency as a binary signal, a data bit 1 is transmitted as carrier ON and logic 0 as carrier OFF. The transmitted data bit rate is set to a conveniently low rate, typically 37.5 BAUD for the purposes of EM interference rejection by the surface located receiver circuits. In normal operation the transmitter will be OFF for integral multiples of the bit rate, this period is available for receiving data.

Because the receive data rate is set faster than the output transmitted data rate, the transmission and reception processes can be interleaved. In a typical embodiment transmit is set at 37.5 BAUD and receive 4800 BAUD. This ratio gives a maximum of 128 data bits can be received during each transmitted logic 0-bit period. It is desirable to provide a practical time interval after transmission stops for receive circuits to recover and become ready to detect the incoming data; accordingly a practical limit is typically 100 bits.

With synchronous communication processes between received and transmitted data the interleaving process described may be complicated to control. This process can be simplified by reducing the amount of data transmitted and increasing the number of times it is transmitted. By this means the probability of successful communication can be increased at the expense of overall data rate.

Figure 12:
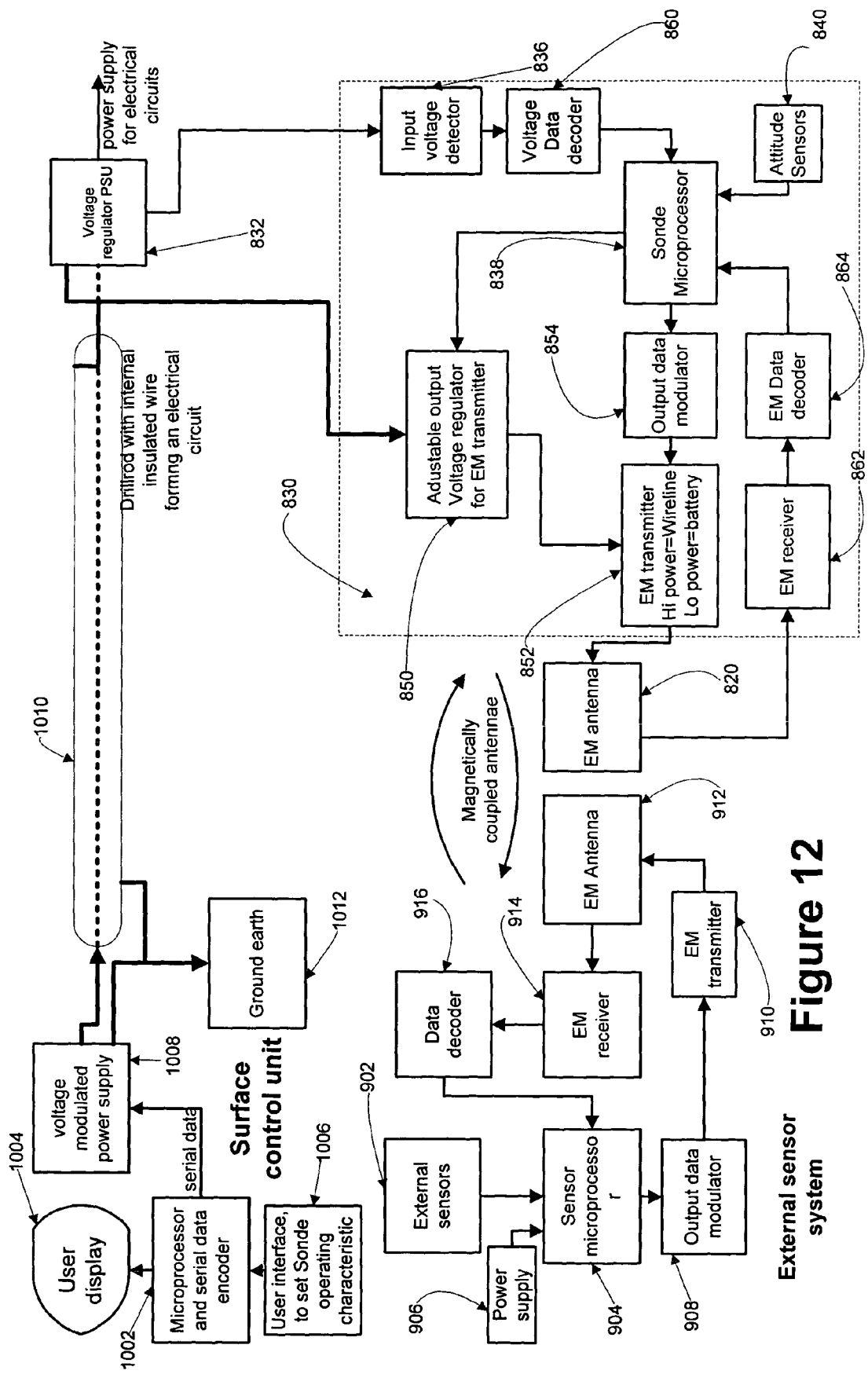
FIG. 12 shows a system employing the sonde of the fourth embodiment.

FIG. 12 shows a system for bi-directional communication according to the fourth embodiment of the invention. The system comprises a sonde 800, as described above, a surface control unit 1000, and an external sensor system 900. The external sensor system 900 and sonde 800, communicate via the magnetically coupled antennae 820, 912 as described above.

One or more features of the sonde of the fourth embodiment can be incorporated into the sonde of the first, second or third embodiments in order that the sonde of the fourth embodiment can operate in the same transmission manner as that of the first, second and third embodiments, as described above i.e. using the same emission system that works whether in wireline or battery operation. Additionally, one or more features of the surface control unit for use with the first embodiment may be incorporated into the surface control unit of the fourth embodiment, and vice versa.

Parts of the present invention can be implemented in hardware, software, firmware, and/or combinations thereof, including, without limitation, gate arrays, programmable arrays ("PGAs"), Field PGAs ("FPGAs"), application-specific integrated circuits ("ASICs"), processors, microprocessors, microcontrollers, and/or other embedded circuits, processes and/or digital signal processors, and discrete hardware logic. Parts of the present invention can be implemented with digital electronics, with analogue electronics and/or combinations of digital and analogue electronics.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A data sonde for use in horizontal drilling, the data sonde comprising:
   emitting means for emitting a first modulated signal from the data sonde, the first signal comprising zero and non-zero emission components in different periods; and
   receiving means for receiving an intermittent second data signal during first signal zero emission periods.

2. A data sonde according to claim 1, wherein the emitting means is arranged to emit the first modulated signal at a first data rate and the receiving means is arranged to receive the second modulated signal at a second, higher, data rate.

3. A data sonde according to claim 1, wherein the emitting means is for emitting an electromagnetic signal.

4. A data sonde according to claim 1, wherein the receiving means is for receiving an electromagnetic signal.

5. A data sonde according to claim 1, wherein the receiving means is for receiving a signal from the power source of the sonde.

6. A data sonde according to claim 1, wherein the receiving means is for receiving data from a sensor system external to the sonde.

7. A data sonde according to claim 1, wherein the sonde is adapted to output at least part of data received by the receiving means in the signal emitted from the emitting means.

8. A data sonde according to claim 1, wherein the sonde is adapted to change operational mode on receiving instructions contained in the signal received at the receiving means.

9. A data sonde according to claim 1, wherein the emitting means is for emitting a radiative electromagnetic field.

10. A data sonde according to claim 1, wherein the receiving means is for receiving signals for upgrading software stored on the sonde.

11. A data sonde according to claim 1, wherein the data sonde further comprises:
power receiving means for receiving a power supply from either of at least one internal battery and an external power supply cable,
wherein the emitting means is also adapted to receive operative power from an external power supply when one is connected to the receiving means, and from a battery if no external power supply is connected to the receiving means.

12. A data sonde according to claim 11, further comprising control means for controlling the emitting means.

13. A data sonde according to claim 12, wherein the control means is for selectively energising the emitting means.

14. A data sonde according to claim 12, wherein the control means is for decoding signals received by the receiving means.

15. A data sonde according to claim 11, wherein the emitting means is for emitting a radiative signal and also for emitting a signal though the external power supply when one is connected to the sonde.

16. A method of bi-directional communication between a data sonde for use in horizontal drilling, and a device external to the sonde, the method comprising:
emitting a first modulated signal from the data sonde, the first signal comprising zero and non-zero emission components in different periods; and
receiving an intermittent second data signal during first signal zero emission periods.

17. A method according to claim 16, wherein the first modulated signal is at a first data rate and the second modulated signal is at a second, higher, data rate.

18. A method according to claim 16, wherein the emitting means emits an electromagnetic signal.

19. A method according to claim 16, wherein an electromagnetic signal is received.

20. A method according to claim 16, wherein a signal from the power source of the sonde is received.

21. A method according to claim 16, wherein data from a sensor system external to the sonde is received.

22. A method according to claim 16, wherein at least part of data received in the signal emitted from the emitting means is emitted in the emitted signal.

23. A method according to claim 16, wherein the sonde changes operational mode on receiving instructions contained in the signal received at the receiving means.

24. A method according to claim 16, wherein a radiative electromagnetic field is emitted.

25. A method according to claim 16, wherein signals for upgrading software stored on the sonde are received.

26. A method according to claim 16, wherein the data sonde is powered by either of at least one internal battery and an external power supply cable, and operative power is received from an external power supply when one is connected to the receiving means, and from a battery if no external power supply is connected.

27. A method according to claim 26, wherein the emission is periodic.

28. A method according to claim 26, wherein a radiative signal is emitted and a signal is also emitted though the external power supply when one is connected to the sonde.

29. A data sonde for use in horizontal drilling, the data sonde comprising:
an antenna;
a receiver; and
circuitry configured to control the antenna to emit a first modulated signal from the data sonde, the first signal comprising zero and non-zero emission components in different periods, and to control the receiver to receive an intermittent second data signal during first signal zero emission periods.

30. A data sonde according to claim 29, wherein the circuitry is adapted to control the antenna to emit the first modulated signal at a first data rate and to control the receiver to receive the second modulated signal at a second, higher, data rate.

31. A data sonde according to claim 29, wherein the antenna is adapted to emit an electromagnetic signal.

32. A data sonde according to claim 29, wherein the receiver is the antenna.

33. A data sonde according to claim 29, wherein the receiver is adapted to receive a signal from the power source of the sonde.

34. A data sonde according to claim 29, wherein the receiver is adapted to receive data from a sensor system external to the sonde.

35. A data sonde according to claim 29, wherein the sonde is adapted to output at least part of data received by the receiving means in the signal emitted from the antenna.

36. A data sonde according to claim 29, wherein the sonde is adapted to change operational mode on receiving instructions contained in the signal received at the receiver.

37. A data sonde according to claim 29, wherein the antenna is adapted to emit a radiative electromagnetic field.

38. A data sonde according to claim 29, wherein the circuitry is configured to decode signals comprising data to upgrade software stored on the sonde received by the receiver, and the sonde is adapted to so upgrade the software.

39. A data sonde according to claim 29, wherein the data sonde further comprises:
a power supply receiving unit to receive a power supply from either of at least one internal battery and an external power supply cable,
wherein the antenna is also adapted to receive operative power from an external power supply when one is connected to the power supply receiving unit, and from a battery if no external power supply is connected to the power supply receiving unit.

40. A data sonde according to claim 39, wherein the circuitry is configured to selectively energising the antenna.

41. A data sonde according to claim 39, wherein the circuitry is configured to decode signals received by the receiver.

42. A data sonde according to claim 39, wherein the antenna is adapted to emit a radiative signal, and also adapted to emit a signal though the external power supply when one is connected to the sonde.

43. A system for communicating between a data sonde and a remote apparatus, the system comprising:
an antenna;
a receiver;
circuitry configured to control the antenna to emit a first modulated signal from the data sonde, the first signal comprising zero and non-zero emission components in different periods, and to control the receiver to receive an intermittent second data signal during first signal zero emission periods,
a data sonde according to any one of claims 1 to 15 or 29 to 42; and a sensor system magnetically coupled to the data sonde, the magnetic coupling providing a bi-directional communication channel between data sonde and sensor system.

44. A system for communicating between a data sonde and a remote apparatus, the system comprising:
an antenna;
a receiver;
circuitry configured to control the antenna to emit a first modulated signal from the data sonde, the first signal comprising zero and non-zero emission components in different periods, and to control the receiver to receive an intermittent second data signal during first signal zero emission periods,
a data sonde, and
a surface control unit physically coupled to the data sonde, the physical coupling providing a bi-directional communication channel between data sonde and surface control unit.

* * * * *